Oct. 26, 1971 R. F. WUERKER 3,615,123
MULTIPLE EXPOSURE HOLOGRAPHIC SYSTEM
Filed May 26, 1969 2 Sheets-Sheet 1

Ralph F. Wuerker
INVENTOR.

BY *[signature]*

ATTORNEY

United States Patent Office 3,615,123
Patented Oct. 26, 1971

3,615,123
MULTIPLE EXPOSURE HOLOGRAPHIC SYSTEM
Ralph F. Wuerker, Palos Verdes Estates, Calif., assignor to TRW Inc., Redondo Beach, Calif.
Filed May 26, 1969, Ser. No. 827,778
Int. Cl. G02b 27/00
U.S. Cl. 350—3.5
8 Claims

ABSTRACT OF THE DISCLOSURE

A holographic system for recording multiple-exposure holograms. The holograms are taken by a pulsed laser and each repetitive reference beam is deflected so that it reaches the recording material at a plurality of discrete different angles. Each of the multiple-exposure recordings of the hologram may be reproduced by a reference beam having the same angle as that at which it was taken. The reference beam may, for example, be deflected by utilizing an electro-optical retarder followed by a birefringent crystal for deflecting the beam in accordance with its direction of polarization. The paths of the reference beams for each discrete angle may be equalized by the provision of a plurality of reflectors disposed along an ellipse having the recording material and a first reflector as its focal points.

BACKGROUND OF THE INVENTION

This invention relates generally to holography, and particularly relates to a holographic system for recording multiple-exposure holograms.

For many purposes it is desirable to have a high-speed camera system which permits the recording of holograms. This would make it possible to investigate unpredictable events which change at a high velocity. For example, the impact of bullets on materials, the operation of fuel injectors or combustion chemical reactions may be investigated with such a system. This is particularly desirable in the field of holography because each hologram permits the investigation of the recorded phenomenon in three dimensions.

In general, it would be very difficult, if not impossible, to provide a camera which changes film frames at the extremely high frame rate desired. For example, it may be desired to record at least a million exposures per second or more.

In accordance with the present invention, it is proposed to make use of multiple-exposure holograms. It is known that several recordings can be made on the same recording material which may, for example, consist of a photographic plate or film or of a photochromic material. Each of the multiple-exposures may be uniquely identified by recording it with a reference beam having a different angle when it reaches the recording material. Therefore each of the multiple recordings can be uniquely reproduced by utilizing a reference beam having the appropriate angle. When done as disclosed herein there is little cross-talk between the different recordings on the same hologram.

It is accordingly an object of the present invention to provide a holographic system where each hologram is taken with multiple exposures so as to record high velocity events at very short time intervals.

Another object of the present invention is to provide a multiple-frame holographic system which permits to record rapidly changing events within very short time intervals of the order of microseconds or less and which permits to reproduce each exposure of a multiple-exposure hologram in slow motion.

Still another object of the present invention is to provide a holographic system of the type referred to where multiple-exposure holograms are taken within short time intervals by electronically changing the angle of reflection of the reference beam by which each exposure is made.

SUMMARY OF THE INVENTION

A holographic system in accordance with the present invention serves the purpose of recording multiple-exposure holograms. The system comprises a pulsed laser. This will generate repetitive light beams of substantially monochromatic light. Each of these light beams is split by a beam splitter into a subject beam and a reference beam. A recording material is provided for recording the multi-exposure hologram. This recording material may consist in a conventional way of a photographic plate or film of a photochromic material or any other suitable photosensitive recording material.

The subject beam is now directed onto the recording material by suitable optical means. This may include, for example, a reflector. Means are provided for deflecting successive reference beams so that each reference beam reaches the recording material at a different, discrete angle. Finally, means are provided for substantially equalizing the pathe of the reference beam and of the scene beam for each of the discrete angles. This latter means may, for example, include a first reflector for the reference beam and a plurality of spaced, further reflectors, one for each discrete angle. These further reflectors are disposed along an ellipse having as its focal points the first reflector and the recording material.

Preferably the reference beam is deflected by electro-optical means such as an electro-optical retarder and a birefringent crystal which will deflect the direction of the reference beam. Such electro-optical retarders are well-known and have the advantage that they can be operated within a very short time interval, such as a fraction of a microsecond.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
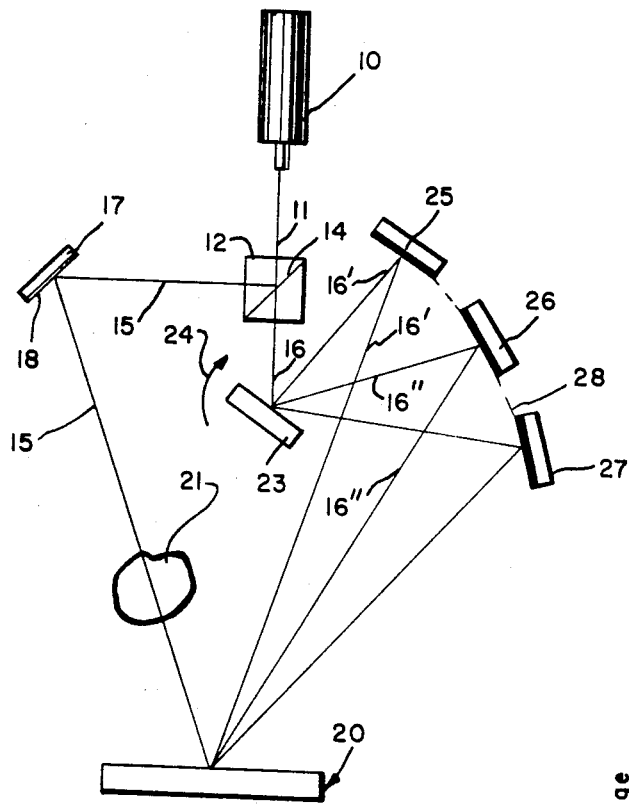
FIG. 1 is a schematic representation of a holographic system in accordance with the present invention and including a rotating mirror for deflecting the reference beam.

Referring now to the drawings, wherein like elements are designated by the same reference characters, and particularly to FIG. 1, there is illustrated a holographic system embodying the present invention. The system includes a laser 10 which has been schematically indicated. Preferably this is a laser of the pulsed type which can be energized to generate repetitive, substantially monochromatic light beams 11. By way of example, the laser 10 may be a pulsed ruby laser. The light beam 11 then impinges on a beam splitter 12. This may, for example, consist of two prisms having an inclined surface 14 which may be silvered or otherwise made partially reflecting. Accordingly, the initial light beam 11 is split into a scene beam 15 and a reference beam 16. The scene beam 15 may represent a large portion of the intensity of the original light beam 11 and may be created by reflection at the silvered surface 14. The reference beam 16 then passes through the two prisms and represents only a small portion of the initial light intensity.

The scene beam 15 is then reflected by a reflector 17. This may, as shown, consist of a mirror having a front face 18 provided with a reflecting material such as silver or aluminum. The scene beam 15 then impinges on the recording material 20. This may consist, for example, of a photographic film or plate, of a photochromic material or any other suitable photosensitive recording material. The scene or object to be recorded is shown at 21 in the path of the scene beam 15. Since the scene beam 15 passes through the object 21, this is a holographic system for recording information in transmission rather than in reflection. For reflection holography, such as a pressurized casting and similar applications, the mirror 17 may be removed and the object placed instead at its location.

The reference beam 16 now impinges on a reflector or mirror 23 which as shown by the arrow 24, may rotate in a clockwise direction. A plurality of reflectors, such as 25, 26 and 27, is disposed to receive light from the reflector 23 and to reflect it onto the recording material 20.

Thus, a first reference beam 16′ is reflected from the mirror 23 on the reflector 25 and is shown in full lines. A second reference beam 16″ is reflected by the reflector 23 onto the reflector 26 and then onto the recording material 20 and so on.

In order to provide temporal coherence of the laser beam, it is highly desirable that the paths of the scene beam 15 and of the reference beam 16 are identical in length. If the lengths of the two beam paths are not equal, and if they differ by more than the coherence length of the laser, interference between the two light beams is no longer possible and hence, a hologram can no longer be recorded. Therefore in accordance with the present invention, the reflectors 25, 26 and 27 are disposed along an ellipse 28. This ellipse 28 has a first focal point in the reflector 23 and has a second focal point in the recording material 20. In other words, the two focal points are where the reference beam 16 impinges on the reflector 23 and a second focal point where the reference beam impinges on the recording material 20. It is a well-known property of an ellipse that the paths from the two focal points to any point on the periphery are equal.

It will now be seen that as the mirror or reflector 23 rotates the reference beam 16 will be deflected in the direction shown by the reference beams 16′, 16″, etc. Accordingly the reference beam is successively reflected by the reflectors 25, 26 and 27 onto the recording material 20. Therefore each exposure is made with the reference beam forming a different angle with the recording material 20.

Such multi-exposure holograms may be reproduced in a similar manner. In other words, if a reproducing beam is projected onto the holograms 20 at the same angle at which the original reference beam did impinge on the recording material 20, the appropriate hologram can be reproduced. This may, for example, be done with the same setup shown in FIG. 1. All that is needed is to remove the beam splitter 12. The different reproducing beams may be generated in the manner just explained.

Preferably the rotation of the reflector 23 is timed with the light pulses generated by the laser 10. In other words, for each successive light pulse generated by the laser 10, the reflector or mirror 23 should be in the appropriate position to reflect the reference beam successively to the reflectors 25, 26, 27, etc. It will be noted that the number of exposures is only limited by the number of reflectors such as 25, 26, 27 and by the capacity of the recording material 20.

It is well-known that there are physical limits to the speed of rotation of a light reflector such as 23. Accordingly, it is not possible to make holographic recordings at very short time intervals with the system illustrated in FIG. 1. This, however, may be effected by utilizing not a mechanical beam deflector, but an electro-optical beam reflector. This may, for example, consist of an electro-optical retarder and a birefringent prism. The latter having the property of deflecting the light in accordance with the plane of polarization or the direction of polarization thereof. Thus the arrangement can be such that either the ordinary or the extraordinary light ray may be generated in a crystal.

Figure 2:
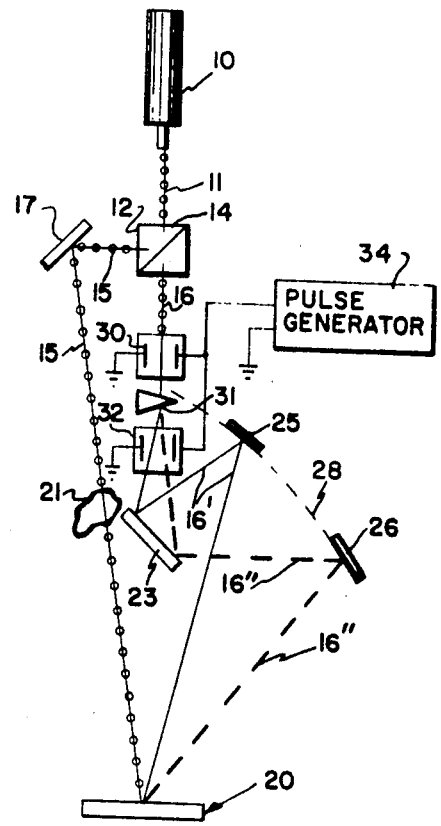
FIG. 2 is a schematic representation of a holographic system generally similar to that of FIG. 1, but including an electro-optical retarder and a birefringent prism for deflecting the reference beam into one of two predetermined positions.

Such a system is illustrated in FIG. 2 to which reference is now made. The system of FIG. 2 shows a two-stage holographic camera, that is, a camera where the reference beam may be deflected into one of two discrete directions. Another electro-optical system which permits more than two deflections of the reference beam will be subsequently explained in connection with FIG. 4.

Referring now to FIG. 2, there is again provided the laser 10 for generating both a reference beam 16 and a scene beam 15. The scene beam 15 is reflected in the manner previously described. The reference beam 16 after passing through the beam splitter 12 is now deflected in accordance with the present invention by means of an electro-optical retarder 30. There is further provided an element 31 consisting of birefringent material which is preferably in the form of a prism 31. A second electro-optical retarder 32 may also be interposed into the path of reference beam 16 for a purpose to be presently explained.

The prism 32 consisting of a birefringent material may, for example, be made of calcite. The electro-optical retarders 30 and 32 may, for example, consist of a Kerr cell or of a Pockels cell. A Kerr cell may, for example, be filled with a suitable liquid, such as nitrobenzene which becomes birefringent when an electric field is applied thereto. In lieu of utilizing a Kerr cell, it is also possible to make use of a Pockels cell. This may consist, for example, of a crystal of potassium dihydrogen phosphate or of ammonium dihydrogen phosphate. Again, these are birefringent crystals which change the direction of polarization of the light. Thus plane polarized light may change its plane of polarization or it may be converted into elliptically or circularly polarized light, that is, light which has two vectors which are at an angle to each other. If the two vectors are equal, the light is said to be circularly polarized, and otherwise it is elliptically polarized.

For the purpose of applying the proper bias potential to the two electro-optical retarders 30 and 32, there may be provided a suitable pulse generator 34 having one terminal grounded while the other terminal is connected to one of the electrodes of the two electro-optical retarders 30 and 32.

Figure 3:
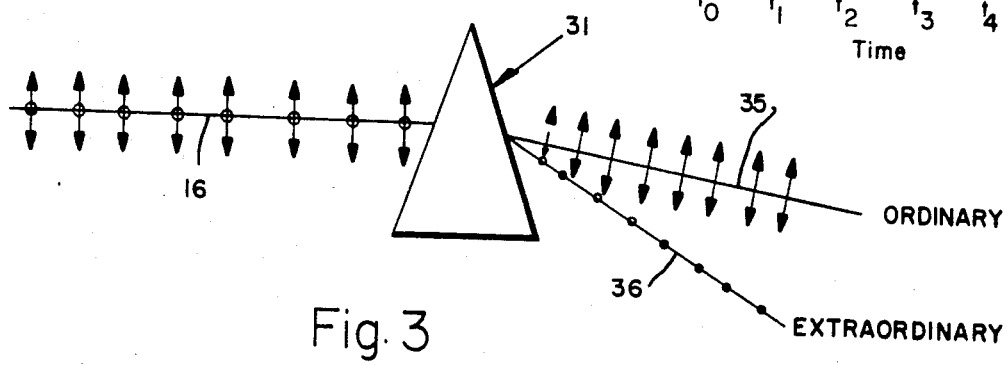
FIG. 3 is a cross-sectional view of the birefringent crystal of FIG. 2 and showing a light beam passing through the crystal and emerging either as an ordinary or an extraordinary light ray.

The operation of the prism 31 may now be explained by reference to the diagram of FIG. 3. Here the reference beam 16 is shown to pass through the prism 31 consisting of a suitable birefringent material. Depending on the plane of polarization of the light, the light beam 35 issuing from the prism 31 may have a relatively small deflection or another light beam 36 may issue having a relatively large deflection. The light beam 35 is the ordinary ray and the light beam 36 is the extraordinary ray. As shown, these have different directions of polarization. Thus, the ordinary light ray 35 is polarized in the plane of the paper while the extraordinary light ray 36 is polarized at right angles to the plane of the paper. Thus, depending on the original direction of polarization of the light, the light can be made to emerge either as the beam 35 or 36.

It may now be assumed that say the ordinary ray is deflected in such a manner that it is reflected by the reflector 23 onto the reflector 25 and eventually impinges on the recording material 20 as shown by the light beam 16'. In that case, the extraordinary ray is deflected by the prism 31 in such a manner that it will be reflected by the reflector 26 as shown in dotted lines by the path of the reference beam 16''.

The purpose of the second electro-optical retarder 32 is to restore the direction of polarization of the reference beam 16 to its original direction of polarization. This is so because the two light beams, that is the scene beam and the reference beam, can only create an interference pattern with each other if they have the same direction of polarization.

It will thus be seen that by applying a suitable potential, which may be on the order of 12,000 volts in the case of a Kerr cell filled with nitrobenzene, that the reference beam may be deflected into one of two possible directions. Accordingly, two separate holograms may be recorded on the same recording material. The number of exposures which can be recorded on one sheet of recording material depends on the volume of the scene to be recorded and on the viewing angle. Preferably, a relatively thick emulsion in the case of a film or photographic plate is used, or a relatively thick photochromic material. This will permit to record a larger number of exposures on the same recording material.

The recorded hologram may be reproduced either with the arrangement of FIG. 2 or with that of FIG. 1, that is, by means of a rotating mirror. In some cases, it may be preferred to study the recording at slow speed. In that case, a rotating mirror may be used with advantage. Where it is desired to view the recordings at the same speed at which they were taken, it will generally be of advantage to use the deflection system of FIG. 2. In any case, the beam splitter 12 may be removed so that there is no scene beam 15.

Figure 4:
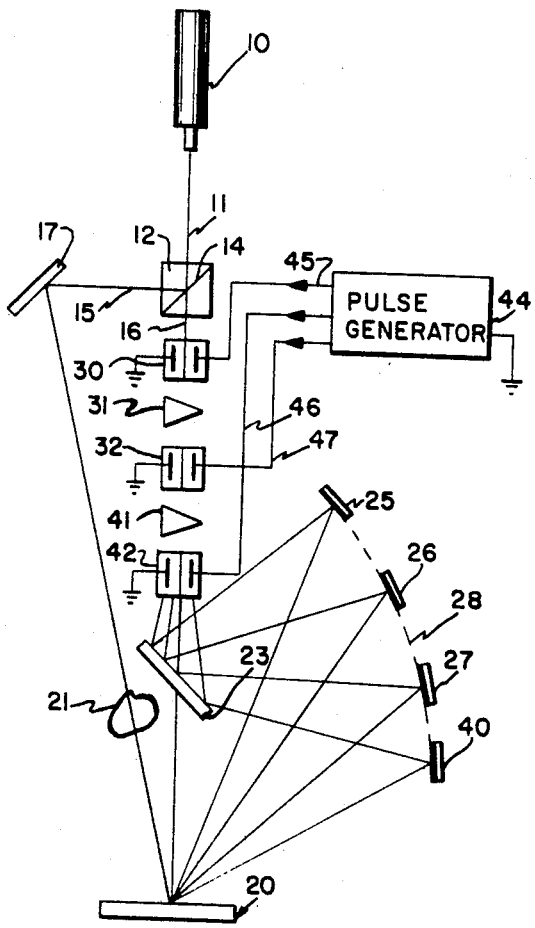
FIG. 4 is a schematic representation of a holographic system utilizing two sets of electro-optical retarders for deflecting a light beam into one of four pre-determined directions.

The embodiment of the invention of FIG. 4 illustrates a more sophisticated form of the invention which makes it possible to deflect the reference beam 16 into one of four predetermined positions. To this end, the reference beam 16 is reflected first by the reflector 23 and then by a succession of additional reflectors 25, 26, 27 and 40, all being disposed along the periphery of an ellipse 28. Disposed in the path of the reference beam 16 is a first electro-optical retarder 30, a first prism 31, a second electro-optical retarder 32, a second prism 41 and a third electro-optical retarder 42. The three retarders 30, 32 and 42 may be enegized by the pulse generator 44 having separate output leads 45, 46 and 47 connected to one of the electrodes of each of the retarders 30, 32 and 42.

Accordingly, the first deflecting system consisting of retarder 30 and prism 31 will deflect the reference beam 16 into one of two predetermined directions. The second deflecting system consists of the retarder 32 and the prism 41. They will operate in exactly the same manner previously described to deflect the reference beam into two additional directions. Accordingly, the reference beam can now be deflected into two times two or four different directions. Finally, the last retarder 42 serves the purpose to restore the direction of polarization of the reference beam 16 to its original direction of polarization for the reasons previously indicated.

Figure 5:
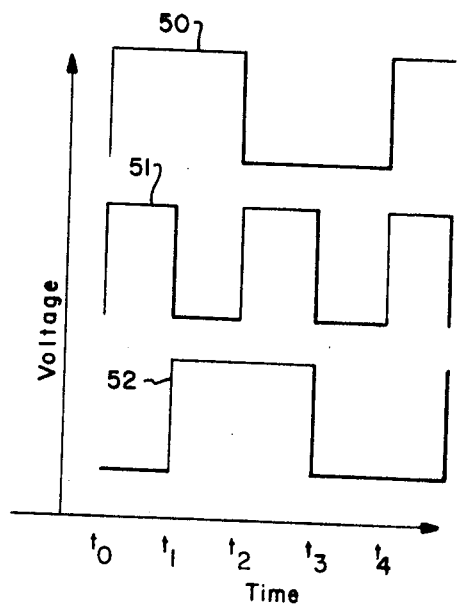
FIG. 5 is a chart plotting voltage as a function of time for three different wave shapes which may be used for energizing the three electro-optical retarders used in the system of FIG. 4.

The bias voltages which must be supplied by the pulse generator 44 are plotted in FIG. 5 as a function of time. Thus, the voltage wave 50 is applied to the retarder 30, during the four time intervals in question $t_0$ to $r_4$. The voltage wave 50 is high during the time period from $t_0$ through $t_2$ and is low for the remaining period from $t_2$ through $t_4$.

The voltage wave 51 is applied to the retarder 32. This wave is alternatively high and low once during each of the four times intervals in question. Finally, the voltage wave 52 is low during the first time intervals from $t_0$ through $t_1$, then is high during the next two time intervals and then becomes low during the next successive two time intervals. It will be noted that the combination of the curves 50 and 51 will cause the light beam to be deflected into two discrete and separate directions. As indicated before, the voltage wave 52 serves the purpose to restore the direction of polarization to that which the reference beam originally had.

The electro-optical deflecting systems shown in FIGS. 2 and 4 have the further advantage over the mechanical system shown in FIG. 1 that there is no relative motion between the scene and reference beams. As a result, far greater framing rates can be realized with the system of the invention.

It should be noted that it is also possible to deflect the reference beam 16 in two different planes. All that has to be done in the arrangement of FIG. 4 is to rotate the prism 41 by 90 degrees in a plane intersecting the paper plane. It is also evident that instead of having two deflecting systems, more than two may be provided so as to deflect the reference beam into more than four discrete directions, such as eight or more.

It should also be noted that the electro-optical retarder may be switched at a rate much in excess of a few million times per second and the framing rate may be as high as two hundred million per second. The number of exposures is only limited by the number of exposures which can be recorded on a particular recording material and by the number of light deflecting systems of the type shown in FIG. 4.

There has thus been disclosed a holographic system for recording multiple exposures at high rates. This is effected by deflecting the reference beam into a number of discrete positions so that it intersects the recording material at different predetermined angles. Successive images may be recorded at a rate as high as two hundred million per second. The hologram may be reproduced at the same rate or at a slower rate as desired. This permits the investigation of unpredictable, continuously changing microscopic events such as impacts of bullets on materials, the operation of a fuel injector or various combustion chemical reactions. The successive holograms may be recorded at a speed that is only limited by the repetition rate of the laser and the switching rate of an electro-optical retarder.

What is claimed is:

1. A holographic system for providing multiple-exposure holograms, said system comprising:
   (a) a pulsed laser for generating substantially monochromatic light beams recurring at predetermined times;
   (b) a beam splitter for splitting said light beam into a subject beam and a reference beam;
   (c) a photosensitive recording material for recording thereon multiple-exposure holograms;
   (d) a first reflector for directing said subject beam onto said recording material, without changing the angle between said subject beam and said recording material; and
   (e) means for deflecting said reference beam so that it reaches said recording material at a plurality of discrete, different angles, said means including a second reflector and a plurality of spaced further reflectors disposed along an ellipse having said second reflector and said recording material as its focal points, each of said further reflectors reflecting said light beam onto said recording material at a different angle, one for each of said monochromatic light beams.

2. A holographic system as defined in claim 1 wherein said means for deflecting said reference beam includes a first electro-optical retarder, a birefringent prism and a second electro-optical retarder for changing the plane of polarization of said reference beam, subsequently deflecting said beam and thereafter changing the plane of polarization again to that of the initial reference beam.

3. A holographic system for recording multiple-exposure holograms, said system comprising:
 (a) a pulsed laser for generating substantially monochromatic light beams recurring at predetermined times;
 (b) a beam splitter for splitting each of said light beams into a subject beam and a reference beam;
 (c) a photosensitive recording material disposed in a predetermined plane for recording thereon multiple-exposure holograms;
 (d) a first reflector for directing said subject beam onto said recording material while maintaining constant the angle therebetween;
 (e) optical means for deflecting said reference beam from a first predetermined direction to a second predetermined direction, said optical means including;
 (f) a first electro-optical retarder disposed in the path of said reference beam;
 (g) a first birefringent deflector arranged to deflect said light beam into one of two predetermined directions in accordance with the plane of polarization of said light beam;
 (h) a second electro-optical retarder; and
 (i) means for energizing said retarders so that said reference beam has one of two predetermined directions of polarization, thereby to deflect said reference beam by said birefringent deflector, said second electro-optical retarder changing the direction of polarization to that of the initial reference beam;
 (j) a second light reflector disposed in the path of the deflected reference beam; and
 (k) a plurality of spaced additional reflectors disposed along an ellipse having said second reflector and said recording material as its focal points, each of said additional reflectors being disposed to reflect said light beam onto said recording material at a different angle.

4. A holographic system as defined in claim 3 wherein an electrical pulse generator is coupled to said retarders for changing the direction of polarization of said reference beam from a first to a second predetermined direction.

5. A holographic system as defined in claim 3 wherein a second birefringent deflector is disposed in the path of said reference beam following said second electro-optical retarder, and a third electro-optical retarder is disposed in the path of said reference beam for deflecting said reference beam into one of four predetermined directions.

6. A holographic system as defined in claim 5 wherein a third birefringent deflector is disposed in the path of said reference beam following said third electro-optical retarder, and a fourth electro-optical retarder is disposed in the path of said reference beam for deflecting said reference beam into one of eight predetermined directions.

7. A holographic system as defined in claim 3 wherein birefringent deflectors are disposed in the path of said reference beam, each following one of said electro-optical retarders, and wherein $(n+v)$ electro-optical retarders are disposed in the path of said reference beam, each for redirecting the direction of polarization of said reference beam into its original direction of polarization, whereby the reference beam may be deflected in one of 2 predetermined directions.

8. A holograph system as defined in claim 7 wherein an electronic pulse generator is coupled to said retarders, thereby to change the plane of polarization of said reference beam into one of $n$ predetermined directions and to return the direction of polarization of said reference beam into its original direction of polarization.

References Cited

Grobin et al.: IBM Technical Disclosure Bulletin, vol. 10, No. 3, August 1967, p. 282–3.

Gates et al.: High Speed Photograph, Proc. of the 8th International Congress, Stockholm, June 1968, pp. 304–8.

DAVID SCHONBERG, Primary Examiner

R. J. STERN, Assistant Examiner

U.S. Cl. X.R.

352—84